(12) United States Patent
Zhong et al.

(10) Patent No.: US 8,376,374 B2
(45) Date of Patent: Feb. 19, 2013

(54) REAR WHEEL STEERING HAND CART WITH INTEGRATED BRAKE SYSTEM

(75) Inventors: Zhiqun Zhong, Jiangxi (CN); Yen-Pin Kuo, Guangdong (CN); Chutang Chang, Taipei (TW)

(73) Assignee: Tin How Electronics Co., Ltd., Guangdong (CN)

( * ) Notice: Subject to any disclaimer, the term of this patent is extended or adjusted under 35 U.S.C. 154(b) by 467 days.

(21) Appl. No.: 12/742,493

(22) PCT Filed: Dec. 18, 2007

(86) PCT No.: PCT/CN2007/003649
§ 371 (c)(1),
(2), (4) Date: May 12, 2010

(87) PCT Pub. No.: WO2009/062347
PCT Pub. Date: May 22, 2009

(65) Prior Publication Data
US 2010/0259022 A1    Oct. 14, 2010

(30) Foreign Application Priority Data
Nov. 13, 2007    (CN) .................. 2007 2 0170740 U

(51) Int. Cl.
*B62B 9/08*    (2006.01)
(52) U.S. Cl. ........................ 280/47.38; 188/20
(58) Field of Classification Search ............ 280/47.38, 280/47.34, 642, 645, 647, 650, 651; 188/19, 188/20
See application file for complete search history.

(56) References Cited

U.S. PATENT DOCUMENTS

| | | | | |
|---|---|---|---|---|
| 4,567,964 A * | 2/1986 | Kassai | ............................. | 188/20 |
| 4,618,033 A * | 10/1986 | Kassai | ............................. | 188/20 |
| 5,325,938 A * | 7/1994 | King | ............................. | 188/19 |
| 5,713,585 A * | 2/1998 | Curtis et al. | ............... | 280/47.38 |
| 6,170,615 B1 * | 1/2001 | Cheng | ............................. | 188/20 |
| 6,298,949 B1 * | 10/2001 | Yang et al. | ...................... | 188/20 |
| 6,308,805 B1 * | 10/2001 | Lan | ................. | 188/20 |
| 6,443,468 B1 * | 9/2002 | Eros | ............................. | 280/47.38 |
| 6,742,791 B2 * | 6/2004 | Lan | ............................. | 280/62 |
| 6,817,451 B1 * | 11/2004 | Chen | ............................. | 188/20 |
| 7,059,452 B2 * | 6/2006 | Chen | ............................. | 188/20 |
| 7,077,420 B1 * | 7/2006 | Santoski | ........................ | 280/642 |
| 7,175,004 B2 * | 2/2007 | Kassai et al. | ..................... | 188/31 |
| 7,219,918 B2 * | 5/2007 | Lan | ............................. | 280/642 |
| 7,367,432 B2 * | 5/2008 | Chen | ............................. | 188/19 |
| 7,708,119 B2 * | 5/2010 | Chen | ............................. | 188/19 |
| 7,735,843 B2 * | 6/2010 | Dotsey et al. | ............... | 280/47.38 |
| 7,784,801 B2 * | 8/2010 | Yeh | ............................. | 280/47.38 |
| 8,146,928 B2 * | 4/2012 | Geeslin | ........................ | 280/47.38 |
| 2006/0175783 A1* | 8/2006 | Lan | ............................. | 280/47.38 |
| 2006/0181040 A1* | 8/2006 | Dunney et al. | ............. | 280/47.38 |

(Continued)

*Primary Examiner* — Jeffrey J Restifo
(74) *Attorney, Agent, or Firm* — Jackson IPG PLLC

(57) ABSTRACT

A rear wheel steering hand cart with an integrated brake system includes a main body (10), a push handle (20), a wheel unit (30) and a wheel seat (50) which includes an upper wheel seat (53), a lower wheel seat (51) and a rotary shaft (52); a wheel stop device (40) is disposed between a real wheel (32) and the wheel seat (50); a clutch device (60) is arranged between the upper wheel seat (53) and the lower wheel seat (51), a control rod (71) of the clutch device (60) is connected to the wheel stop device (40), and the clutch device (60) includes the first clutch element (61) and the second clutch element (63).

14 Claims, 3 Drawing Sheets

U.S. PATENT DOCUMENTS

| | | | | |
|---|---|---|---|---|
| 2008/0029982 A1* | 2/2008 | Dotsey et al. | ............. | 280/47.38 |
| 2010/0259022 A1* | 10/2010 | Zhong et al. | ............... | 280/47.34 |
| 2010/0308553 A1* | 12/2010 | Li et al. | ..................... | 280/47.38 |
| 2010/0326775 A1* | 12/2010 | Chen | ............................. | 188/20 |
| 2011/0048867 A1* | 3/2011 | Solinski et al. | ................ | 188/20 |
| 2012/0104712 A1* | 5/2012 | Kobayashi | ................ | 280/47.38 |

\* cited by examiner

REAR WHEEL STEERING HAND CART WITH INTEGRATED BRAKE SYSTEM

The present invention relates to transport tools, and more particularly to a rear wheel steering hand cart with integrated brake system.

GENERAL BACKGROUND

Generally, hand cart uses a method of wheel cart, wheel lock, axle lock and axle stuck to break. However, all of the above methods need to use complex mechanism and cost highly, and parts easy to failure to brake in use. The wheel lock and axle lock methods are weak axle force and bad brake; the wheel stuck and axle stuck need lock crosspiece cooperate with good groove position, result in braking expediently.

SUMMARY

An object of the present invention is to provide a hand cart with an angle changing brake to overcome the aforementioned disadvantages.

According to one exemplary embodiment of the present invention, a rear wheel steering hand cart with an integrated brake system is provided. The rear wheel steering hand cart with integrated brake system includes a main body (10), a push handle (20) disposed on one end of the main body (10); and a wheel unit (30) including at least three wheels disposed under the main body (10) in two lows. A real wheel (32) of the wheel unit (30) is disposed on one end of the push handle (20) connected to the base of the main body (10) via a wheel seat (50); the wheel seat (50) includes an upper wheel seat (53) and a lower wheel seat (51). The upper wheel seat (53) and the lower wheel seat (51) are connected via a rotary shaft (52). the upper wheel seat (53) is disposed on the main body (10), the lower wheel (51) is flexible to connect to a wheel axle (33); a wheel stop device (40) is disposed between the real wheel (32) and wheel seat (50); a clutch device (60) is disposed between the upper wheel seat (53) and the lower wheel seat (51). The clutch device (60) includes a first clutch element (61) covered the rotary shaft (52), radial position of the rotary shaft (52) is connected to the lower wheel seat; a clutch device control division controls separating and closing between the first clutch element (61) and the second clutch element (63).

Other novel features and advantages will become more apparent from the following detailed description when taken in conjunction with the accompanying drawings.

DETAILED DESCRIPTION OF PREFERRED EMBODIMENTS

Reference will now be made to the drawings to describe preferred and exemplary embodiments in detail.

Figure 1:
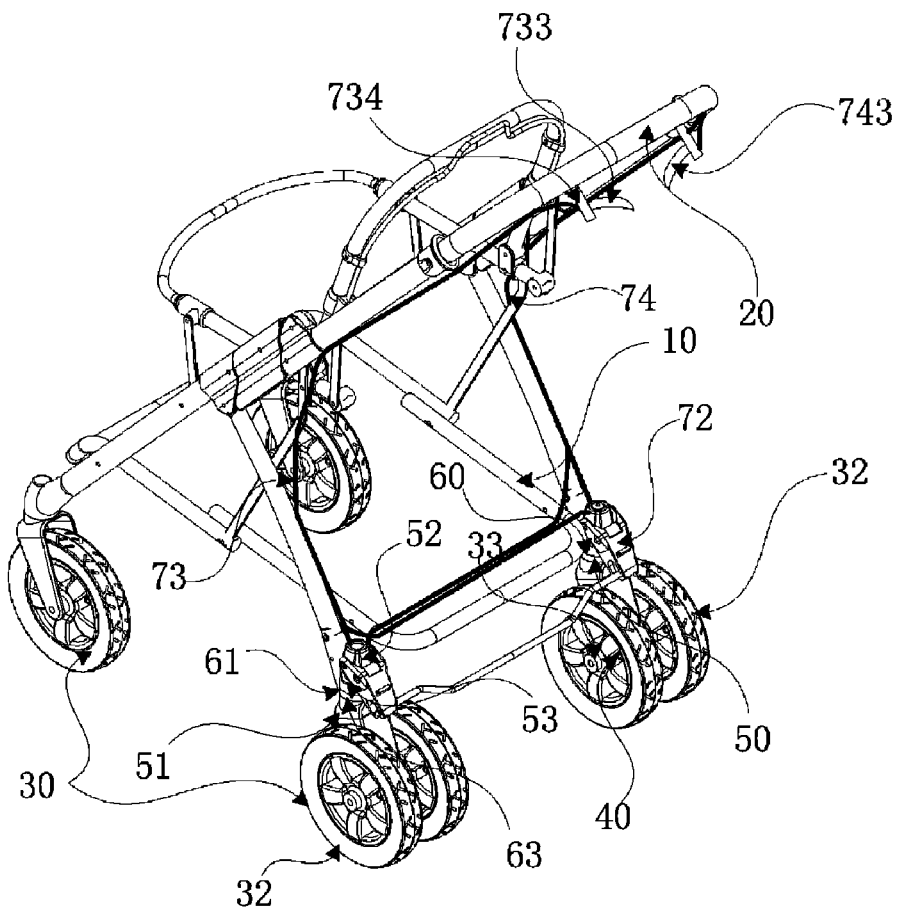
FIG. 1 is a part sectional view of a part of a rear wheel steering hand cart with integrated brake system.

FIG. 1 illustrates a part section view of a part of a rear wheel steering hand cart with integrated brake system. The rear wheel steering hand cart with integrated brake system includes a main body (10), a push handle (20), a wheel unit (30), a wheel seat (50) and a wheel stop device (40). The push handle (20) is disposed on one end of the main body (10). The wheel unit (30) includes at least three wheels disposed under the main body (10) in two lows, a real wheel (32) of the wheel unit (30) is disposed on one end of the push handle (20) connected to the base of the main frame (10) via a wheel seat (50). The wheel seat (50) includes an upper wheel seat (53) and a lower wheel (51), the upper wheel seat (53) and the lower wheel (51) are connected via a rotary shaft (52), the upper wheel seat (53) is disposed on the main body (10), and the lower wheel (51) is flexible connected to a wheel axle (33). The wheel stop device (40) is disposed between the real wheel (32) and wheel seat (50).

According to another embodiment of the invention, the rear wheel steering hand cart with integrated brake system further includes a clutch device (60). The clutch device (60) is disposed between the upper wheel seat (53) and the lower wheel seat (51). The clutch device (60) includes a first clutch element (61) and a clutch device control division. The first clutch element (61) covers out of the rotary shaft (52) and radial position connected to the lower wheel seat. The clutch device control division is controlled separately and closed between the first clutch element (61) and the second clutch element (63).

According to this embodiment, users control the wheel stop device (40) for braking or stopping the hand cart in-situ. The wheel stop device (40) changes traveling angle of two real wheels (32) of the wheel unit (30), and the two real wheels (32) are V-shaped. Others of the wheel unit (30) are also conditioned to each other. The hand cart must overcome at least two rear wheels (32) to travel. The rear wheel steering hand cart with integrated brake system can be used widely, conveniently and reliably.

Figure 6:
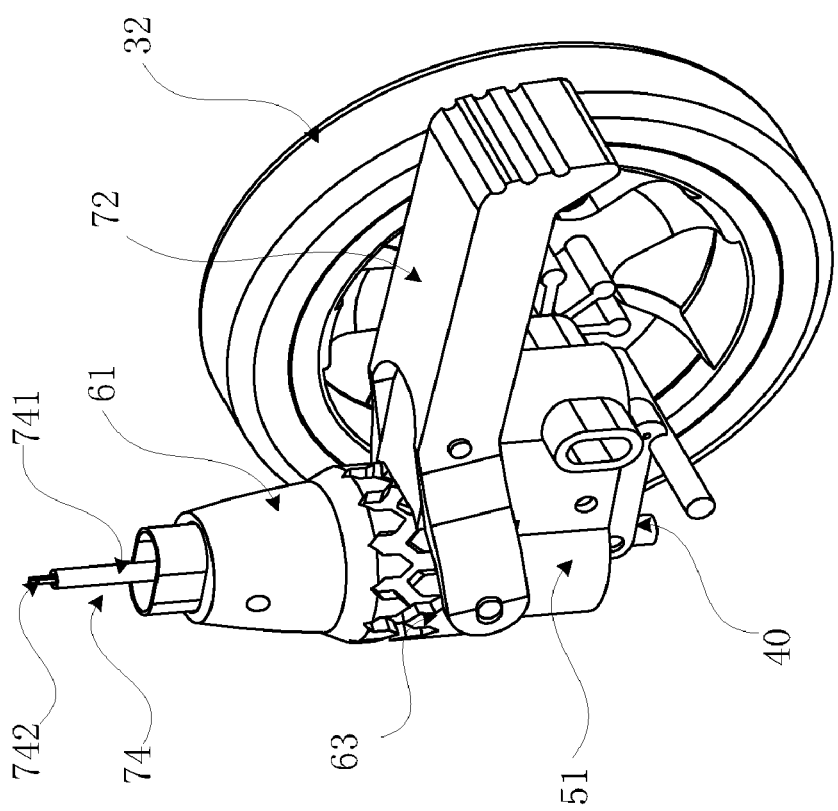
FIG. 6 is a wheel part of a second pull component of a rear wheel steering hand cart with integrated brake system.
Figure 5:
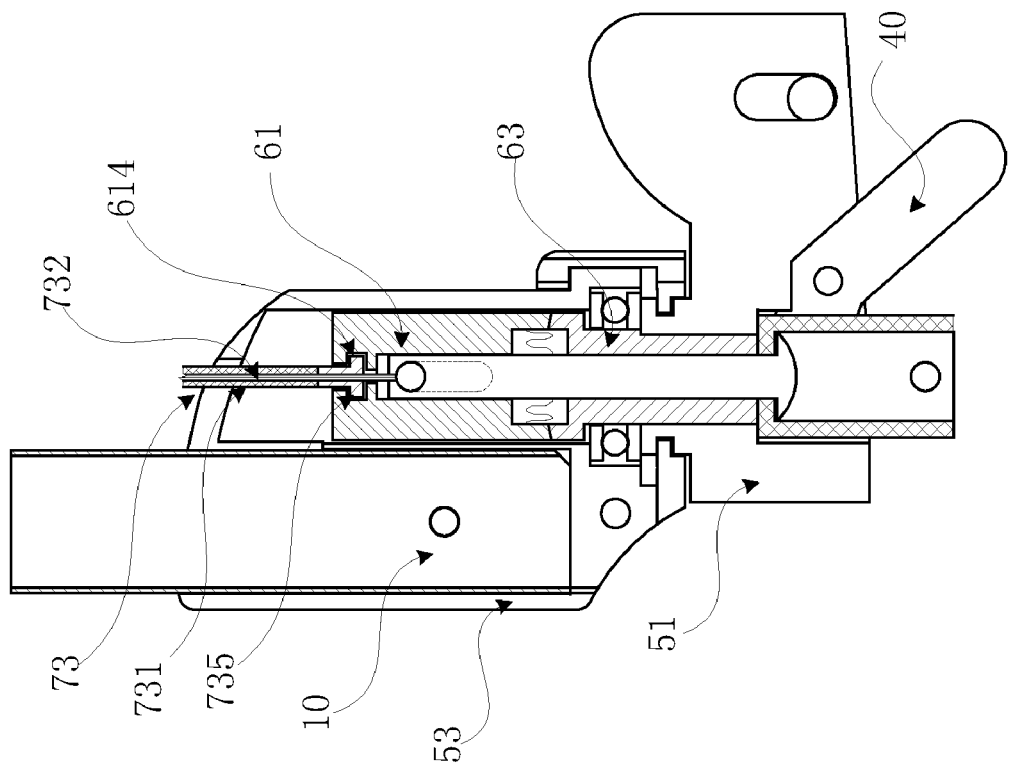
FIG. 5 is a clutch element of a first pull component of a rear wheel steering hand cart with integrated brake system.

Referring to FIG. 1 and FIG. 6, the clutch device control division connects to the wheel stop device (40) for controlling the locking and unlocking of the wheel stop device (40). The clutch device control division breaks the wheel unit (30) for fixing the rotary shaft (52).

Figure 2:
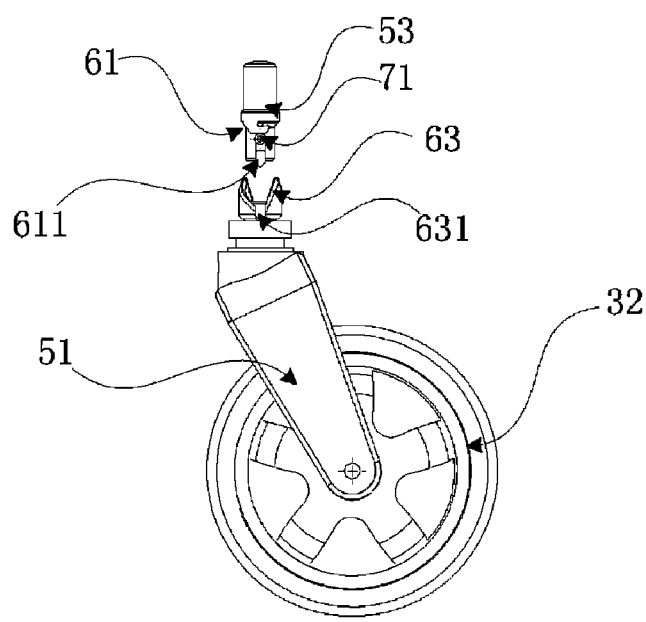
FIG. 2 is a section view of a V-shape open groove of a rear wheel steering hand cart with integrated brake system.
Figure 3:
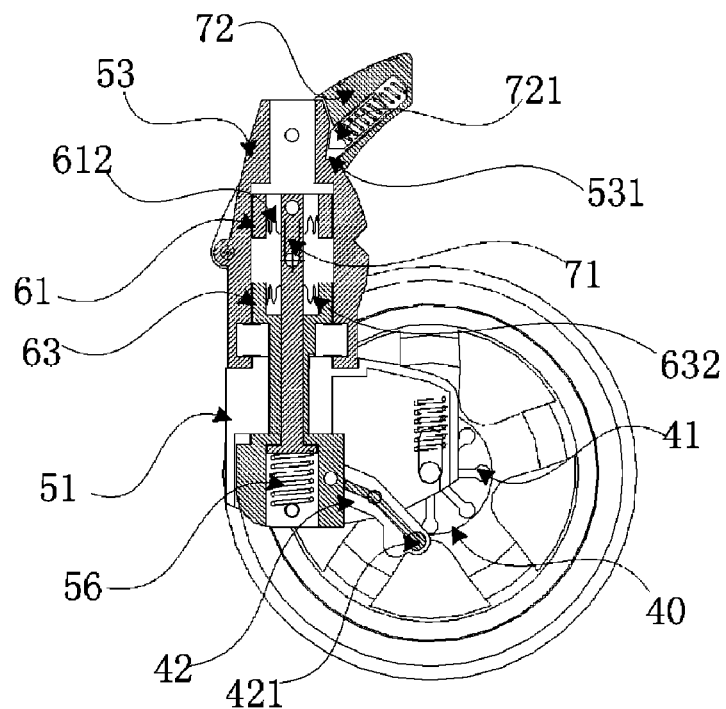
FIG. 3 is a section view of a tooth flank of a rear wheel steering hand cart with integrated brake system.
Figure 4:
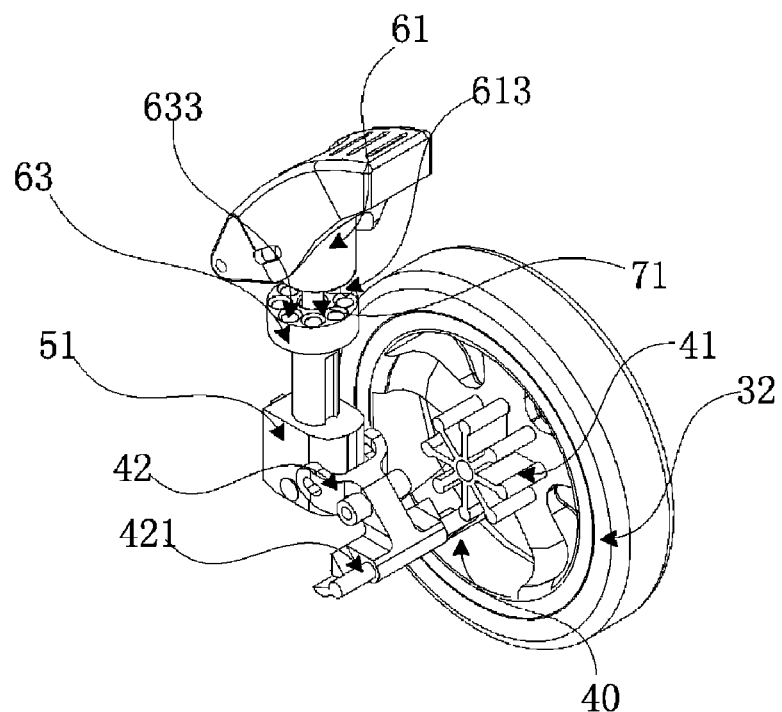
FIG. 4 is a section view of a shrinkage pool of a rear wheel steering hand cart with integrated brake system.

Referring to FIG. 2 to FIG. 4, the clutch device control division is a control rod (71). The control rod (71) is parallel to the rotary shaft (52), and glided between the upper wheel seat (53) and the lower wheel seat (51). The first clutch element (61) is fixed connected to upper end of the control rod (71). The second clutch element (63) is disposed on the lower end of the control rod (71) and fixed to connect to the lower wheel seat (51). The clutch device control division further comprises a control holder (72). One end of the control holder (72) is hinged to connect to the upper wheel seat (53). Middle part of the control holder (72) connects to the control rod (71). In this embodiment, further comprises a restoring spring (56) between the first clutch element (61) and the lower wheel seat (51). When user need to brake the hand cart, the control holder (72) controls the control rod (71) to go down. The control rod (71) drives the first clutch element (61) to post on the second clutch element (63). The second clutch element (63) is fixed to a radial direction due to both of the first clutch element (61) and the upper wheel seat (53) is radial direction. The first clutch element (61) is divorced from the second clutch element (63) quickly when the restoring spring (56) is unlocked.

The second clutch element (63) are two V-shape grooves (631), the two V-shape open grooves (631) connects to each other, the first clutch element (61) is a bump (611). There are two intro bevels at two covers of the bump (611) (FIG. 2). In this embodiment, when the hand cart needs braking, the control holder (72) controls the control rod (71) to go down. The control rod (71) drives the first clutch element (61) to post on the second clutch element (63). The bump (611) of the first clutch element (61) goes down along the open groove of the V-shape open grooves (631). In this embodiment, while the bump (611) presses down, the wheels of the hand cart are wrested to a good angle. For example, when the bump (611) is put in the V-shape open grooves (631), the two real wheels (32) are adducted to a V-shape to condition each other.

The second clutch element (63) is a first tooth flank (632), upper end of the first tooth flank (632) is smaller than bottom end of the first tooth flank (632). The first clutch element (61) is a second tooth flank (612) meshing with the first tooth flank (632) (FIG. 3). In this embodiment, When the hand cart need braking, the control holder (72) controls the control rod (71) to go down, the control rod (71) drives the first clutch element (61) to post on the second clutch element (63), the second tooth flank (612) of the first clutch element (61) goes into mesh with the first tooth flank (632) of the second clutch element (63) for fixing the lower wheel seat (51). Users can fix the lower wheel seat (51) at any moment by this tooth flank clutch device.

The second clutch element (63) is multi shrinkage pools (633). The multi shrinkage pools (633) dispose on a line, each of the multi shrinkage pools (633) comprises a V-shape expansion connected to each other via an edge, the first clutch element (61) is a convex cylinder (613) corresponded to the shrinkage pool (633); the convex cylinder (613) has a cup head or a pointed end (FIG. 4). In this embodiment, when the hand cart needs braking, the convex cylinder (613) inserts to the multi shrinkage pools (633) to break the hand cart.

The clutch device control division is a first pull component (73), comprises a first pull sheath (731) and a first pull (732) glided inside of the first pull sheath (731). One end of the first pull (732) is connected to a first brake handle (733) of the push handle (20). Another end of the first pull (732) is fixed to the rotary shaft (52) or the wheel seat (51). One end of the first pull sheath (731) is connected to a first brake rack (734); another end of the first pull sheath (731) is fixed to the first clutch element (61). The first clutch element (61) has a T-shape groove (614), and a step sleeve (735) is disposed on a coupling end of the first pull sheath (731) and the first clutch element (61), the step sleeve (735) is embedded in the T-shape groove (614). In this embodiment, when the hand cart need braking, users pinch the first brake handle (733) and pulling first pull (732), the first pull (732) pushes the first pull sheath (731) for making one end of the first clutch element (61) to go down. The first clutch element (61) closes to the fixed point of the first pull (732) for pushing the entire first clutch element (61) to go down. The first clutch element (61) and the second clutch element (63) are combined, and the upper wheel seat (53) and the lower wheel seat (51) are locked. When users need to unlock the hand cart, users loosen the first brake handle (733), and the stress of the coupling end of the first pull sheath (731), so the first clutch element (61) is loosened. The first clutch element (61) and the second clutch element (63) are separated.

The first clutch element (61) is fixed on the upper wheel seat (53). The second clutch element (63) is glided up and down along the rotary shaft (52). The clutch device control division is a second pull component (73), comprises a second pull sheath (741) and a second pull (742) glided inside of the second pull sheath (741). One end of the second pull (742) is connected to a second brake handle (743) of the push handle (20); another end of the second pull (742) is connected to the wheel stop device (40) and the second clutch element (63).

One end of the first pull sheath (731) is connected to a first brake rack (734); another end of the first pull sheath (731) is fixed to the first clutch element (61). In this embodiment, when user need to brake the hand cart, user can pinch the second brake handle (743) and pulling second pull (742), the second pull (742) pushes the control element of the second clutch element (63) and the wheel stop device (40) to move up. The first clutch element (61) closes to the second clutch element (63). Users looses the second brake handle (743), the second clutch element (63) drops down, and the fixed point of the first pull (732) for pushing the entire first clutch element (61) to go down. The first clutch element (61) and the second clutch element (63) are combined, and the upper wheel seat (53) and the lower wheel seat (51) are locked. When user needs to unlock the hand cart, user can loosen the first brake handle (733). The first clutch element (61) and the second clutch element (63) are separated for unlocking.

The wheel stop device (40) includes a tooth block (41) fixed on wheels. Middle part of the tooth block is hinged to a deflector rod (42) of the lower wheel seat (51), a fixture block (421) is disposed on the head end of the deflector rod (42) which can embed in the tooth block (41), rear end of the deflector rod (42) is connected to the clutch device control division. In this embodiment, when the hand cart needs braking, the control holder (72) controls the control rod (71) to go down. The fixture block (421) is inserted to the tooth block (41) while the clutch device (60) is locking the lower wheel seat (51) for breaking the wheel unit.

Referring to FIG. 3, the control holder (72) is hinged to the upper wheel seat (53). The control holder (72) is disposed a flexibility fixed bumper (721). The upper wheel seat (53) is disposed a fixed stuck groove (531). When the control holder (72) is pulled to a specific location, the flexibility fixed bumper (721) inserts into the fixed stuck groove (531) for locking the control holder (72).

It is to be understood, however, that even though numerous characteristics and advantages of exemplary and preferred embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A rear wheel steering hand cart with an integrated brake system, comprising:
   a main body (10);
   a push handle (20), disposed on one end of the main body (10);
   a wheel unit (30) disposed under the main body (10), including at least three wheels arranged in two rows, a rear wheel (32) of the wheel unit (30) disposed on one end of the push handle (20) connected to main body (10) by a wheel seat (50);
   the wheel seat (50) including an upper wheel seat (53) disposed on the main body (10) and a lower wheel (51) connecting to a wheel axle (33), the upper wheel seat (53) and the lower wheel (51) connecting to each other by a rotary shaft (52);
   a wheel stop device (40) disposed between the real wheels (32) and the wheel seat (50);
   wherein further comprising a clutch device (60) disposed between the upper wheel seat (53) and the lower wheel seat (51), comprises:
   a first clutch element (61) covered the rotary shaft (52), radial position connected to the upper wheel seat (53);

a second clutch element (63), covered the rotary shaft (52), radial position connected to the lower wheel seat (51), and a clutch device control division, controlling the separation and close of the first clutch element (61) and the second clutch element (63).

2. The rear wheel steering hand cart with an integrated brake system as claimed in claim 1, wherein the clutch device control division connects to the wheel stop device (40) for controlling locking and unlocking of the wheel stop device (40).

3. The rear wheel steering hand cart with an integrated brake system as claimed in claim 1, wherein the clutch device control division is a control rod (71) parallel to the rotary shaft (52), and being glided between the upper wheel seat (53) and the lower wheel seat (51), the first clutch element (61) fixedly connects to the upper end of the control rod (71), and the second clutch element (63) is disposed on the lower end of the control rod (71) and fixedly connects to the lower wheel seat (51); the clutch device control division further comprises a control holder (72), one end of the control holder (72) is hinged to the upper wheel seat (53), and the middle part of the control holder (72) connects to the control rod (71).

4. The rear wheel steering hand cart with an integrated brake system as claimed in claim 3, wherein further comprises a restoring spring (56) disposed between the first clutch element (61) and the lower wheel seat (51).

5. The rear wheel steering hand cart with an integrated brake system as claimed in claim 3, wherein the second clutch element (63) is a two-V-shape open grooves (631), the two-V-shape open grooves (631) connects to each other; the first clutch element (61) is a bump (611), and two intro bevels are disposed at two covers of the bump (611).

6. The rear wheel steering hand cart with an integrated brake system as claimed in claim 3, wherein the second clutch element (63) is a first tooth flank (632), and the shape of the upper end of the first tooth flank (632) is smaller than it of the bottom end of the first tooth flank (632); the first clutch element (61) is a second tooth flank (612) meshing with the first tooth flank (632).

7. The rear wheel steering hand cart with an integrated brake system as claimed in claim 6, wherein the shapes of the first tooth flank (632) and the second tooth flank (612) are triangle, involute, arc, or acumination cusp.

8. The rear wheel steering hand cart with an integrated brake system as claimed in claim 3, wherein the second clutch element (63) is multi shrinkage pools (633) disposed on a radial line, each of the multi shrinkage pools (633) comprises a V-shape expansion open connecting to each other by their edges, and the first clutch element (61) is a convex cylinder (613) corresponding to the shrinkage pool (633).

9. The rear wheel steering hand cart with an integrated brake system as claimed in claim 8, wherein the convex cylinder (613) has a cup head or a pointed end.

10. The rear wheel steering hand cart with an integrated brake system as claimed in claim 1, wherein the clutch device control division is a first pull component (73), which comprises a first pull sheath (731) and a first pull (732) glided along the inside of the first pull sheath (731); one end of the first pull (732) connects to a first brake handle (733) of the push handle (20), another end of the first pull (732) connects to the rotary shaft (52) or the wheel seat (51); one end of the first pull sheath (731) connects to a first brake rack (734), another end of the first pull sheath (731) connects to the first clutch element (61).

11. The rear wheel steering hand cart with an integrated brake system as claimed in claim 10, wherein the first clutch element (61) has a T-shape groove (614); a step sleeve (735) is disposed on a coupling end of the first pull sheath (731) and the first clutch element (61), the step sleeve (735) is embedded in the T-shape groove (614).

12. The rear wheel steering hand cart with an integrated brake system as claimed in claim 1, wherein the first clutch element (61) is fixed on the upper wheel seat (53), and the second clutch element (63) is glided up and down along the rotary shaft (52).

13. The rear wheel steering hand cart with an integrated brake system as claimed in claim 12, wherein the clutch device control division is a second pull component (74), which comprises a second pull sheath (741) and a second pull (742) glided along the inside of the second pull sheath (741); one end of the second pull (742) connects to a second brake handle (743) of the push handle (20), another end of the second pull (742) connects to the wheel stop device (40) and the second clutch element (63); one end of the first pull sheath (731) connects to a first brake rack (734), another end of the first pull sheath (731) is fixed to the first clutch element (61).

14. The rear wheel steering hand cart with an integrated brake system as claimed in claim 1, wherein the wheel stop device (40) comprises a tooth block (41) disposed on wheels, middle part of the tooth block (41) is hinged to a deflector rod (42) of the lower wheel seat (51), a fixture block (421) disposed on the head end of the deflector rod (42) is embedded into the tooth block (41), the rear end of the deflector rod (42) connects to the clutch device control division.

* * * * *